(12) United States Patent  (10) Patent No.: US 7,777,436 B2
Brown et al.                (45) Date of Patent:    Aug. 17, 2010

(54) SENSORLESS DRIVE FOR UNIPOLAR THREE PHASE BRUSHLESS DC MOTORS

(75) Inventors: Robert G. Brown, New Hartford, CT (US); Ashit Kumar Das, Torrington, CT (US)

(73) Assignee: The Bergquist Torrington Company, Torrington, CT (US)

( * ) Notice: Subject to any disclaimer, the term of this patent is extended or adjusted under 35 U.S.C. 154(b) by 231 days.

(21) Appl. No.: 12/172,789

(22) Filed: Jul. 14, 2008

(65) Prior Publication Data
US 2010/0007297 A1    Jan. 14, 2010

(51) Int. Cl.
*H02P 27/04*    (2006.01)
(52) U.S. Cl. ............... 318/400.01; 318/400.1; 318/400.13; 318/400.14; 318/400.17; 318/400.2; 318/400.24; 318/400.26; 318/400.32; 318/700; 318/711; 318/716; 318/712; 318/710; 388/826
(58) Field of Classification Search ............ 318/400.32, 318/400.26, 400.24, 400.2, 400.17, 400.14, 318/400.13, 400.1, 400.01, 700, 716, 711, 318/712, 710; 388/826
See application file for complete search history.

(56) References Cited

U.S. PATENT DOCUMENTS

| | | | |
|---|---|---|---|
| 4,922,169 A * | 5/1990 | Freeman .............. | 318/400.1 |
| 5,017,845 A | 5/1991 | Carobolante et al. | |
| 5,311,069 A | 5/1994 | Austin | |
| 5,550,446 A | 8/1996 | Schlager et al. | |
| 5,569,988 A * | 10/1996 | Kokami et al. ......... | 318/400.35 |
| 5,572,096 A | 11/1996 | Schlager | |
| 5,694,010 A * | 12/1997 | Oomura et al. ........ | 318/400.07 |
| 5,767,639 A * | 6/1998 | Sakaguchi et al. ..... | 318/400.11 |
| 5,818,179 A * | 10/1998 | Kokami et al. ......... | 318/400.04 |
| 5,990,643 A | 11/1999 | Holling et al. | |
| 6,064,539 A | 5/2000 | Null et al. | |
| 6,124,689 A * | 9/2000 | Kardash .................. | 318/400.2 |
| 6,144,179 A | 11/2000 | Kessler et al. | |
| 6,888,328 B2 | 5/2005 | Makaran | |
| 7,030,583 B2 | 4/2006 | Lelkes et al. | |
| 7,692,395 B2 * | 4/2010 | Brown ................... | 318/400.13 |
| 2002/0171388 A1 * | 11/2002 | Seki ........................... | 318/727 |
| 2003/0173922 A1 | 9/2003 | Pelonis | |
| 2004/0135530 A1 | 7/2004 | Liu et al. | |
| 2004/0217665 A1 | 11/2004 | Hans | |
| 2006/0097598 A1 | 5/2006 | Lelkes et al. | |
| 2007/0296372 A1 * | 12/2007 | Hori et al. ................... | 318/716 |

* cited by examiner

*Primary Examiner*—Rita Leykin
(74) *Attorney, Agent, or Firm*—Haugen Law Firm; Frederick W. Niebuhr

(57) ABSTRACT

A system for controlling a trapezoidally (square wave) driven DC motor includes a unipolar commutation circuit coupled between a DC power supply and a brushless DC motor. The motor has three phases formed by respective stator windings coupled at respective proximal ends to a common node and having respective opposite ends remote from the common node. The commutation circuit drives the motor according to a commutation cycle including three primary steps. During each primary step, one of the phases is driven while the other two phases are not driven. Voltages at the remote ends of the undriven phases are sensed, and timing signals are generated at points where the voltages coincide. The timing signals are used to determine motor position and speed, and to synchronize the commutation cycle with motor position and speed. In one embodiment, the commutation cycle includes transitional steps between the primary steps for smoother operation. The system is compatible with high side and low side switching configurations.

27 Claims, 11 Drawing Sheets

SENSORLESS DRIVE FOR UNIPOLAR THREE PHASE BRUSHLESS DC MOTORS

BACKGROUND OF THE INVENTION

The present invention relates to electrically commutated motors operated according to unipolar motor and driver configurations, and more particularly to methods and the devices directed to a less costly and more effective determination of motor position and speed.

Electrically commutated motors have replaced traditional motors in many applications due to a variety of advantages including improved reliability, higher efficiency, lower costs and longer useful life. The most common type of these motors uses three phases, each phase Embodied by a stator winding or group of stator windings. The motor is driven through selective application of drive voltages to the different phases in a repeating sequence known as a commutation cycle.

Electrically commutated motors are generally of two types: sinusoidally commutated motors and trapezoidally commutated motors. In sinusoidally commutated motors, the phases typically are driven simultaneously at different voltages that vary substantially sinusoidally. These motors exhibit BEMF (back electromotive force) wave forms similar to sine waves. Separate position sensors, e.g. Hall effect sensors, are used to generate the rotor position information needed to drive the motor.

In trapezoidally commutated motors, also called square wave driven motors, the phases are driven intermittently. More particularly, in a three phase motor with a bipolar driver configuration, the phases are driven in pairs so that at any given time, one of the phases is not driven. This allows use of the BEMF signal, in particular its zero crossings, to determine rotor positions, a configuration known as sensorless drive since no Hall effect sensors or other position sensors are required. The BEMF signal may be sinusoidal or trapezoidal.

An alternative trapezoidal drive arrangement, known as a unipolar or halfwave motor and drive configuration, requires fewer components than a bipolar configuration since each phase uses one switching element rather than two. Only one of the phases is driven at any given time, so that over a commutation cycle, different pairs of the phases are not driven and produce respective BEMF signals. However, unlike the BEMF signal of the sole undriven phase in bipolar arrangements, neither BEMF signal in a unipolar arrangement provides the unambiguous zero crossings useful in pinpointing rotor angular or temporal positions. Direct measurement of the BEMF signal while commutating the motor, is not possible.

As a result, the conventional method for determining rotor positions, and on that basis determining when to switch from one commutation step to the next, is to mount three Hall effect sensors on the motor to generate position information.

One attempt to overcome this difficulty, in conjunction with trapezoidally driven three phase unipolar motors with essentially sinusoidal BEMF signals, is disclosed in U.S. Pat. No. 5,017,845 (Carobolante, et al). In this instance, the BEMF voltages in two non-energized phases are measured, and the difference between successive voltage difference measurements is used to control commutation. Specifically, a curve of the BEMF differential is generated, and points where the slope of this curve is zero are said to be about thirty degrees from optimal switch points for the commutation cycle.

Although this system may have utility in connection with sinusoidal BEMF signals, it undesirably requires interruption of excitation of the motor phases. Moreover, it is not suitable for trapezoidal commutation with essentially trapezoidal BEMF waveforms, since reliance on a zero slope does not lend itself to accurate readings with BEMF signals having a trapezoidal shape.

Trapezoidally commutated motors frequently are favored over sinusoidally commutated motors due to their lower cost. However, they entail comparatively large current fluctuations in the stator windings during shifts between the driven and undriven states. These fluctuations, known as commutation current ripple, result in a corresponding torque ripple that is undesirable due to increased motor noise and reduced efficiency. U.S. patent application Ser. No. 11/941,426 (Brown) assigned to the assignee of this application and incorporated herein by reference, addresses this problem in connection with bipolar motor and drive configurations. There remains a need to counteract this problem with unipolar configurations Therefore, the present invention has several aspects directed to one or more of the following objects:

to provide a unipolar commutation circuit and controller operable to selectively apply different voltages to different motor phases for smoother operation of trapezoidally commutated motors;

to provide, in three phase electrically commutated motors, sensorless position and speed detection, regardless of whether the back electromotive force waveforms of the motor phases are trapezoidal or sinusoidal;

to provide a means for using differences between the BEMF signals of two undriven phases, measured at projected points of their expected coincidence, to alter a commutation cycle towards synchronization with motor position and speed; and to provide, in a brushless DC motor configuration including a unipolar commutation circuit, a process for synchronizing the commutation cycle with motor position and speed without sensing or measuring BEMF signals in the motor stator windings.

SUMMARY OF THE INVENTION

To achieve these and other objects, there is provided a system for controlling a brushless DC motor. The system includes a unipolar motor commutation circuit adapted to be coupled between a DC power supply and a brushless DC motor that includes first, second, and third stator windings corresponding to first, second and third motor phases. The stator windings have respective first, second, and third proximal end terminals coupled to a common node, the stator windings also have respective first, second, and third remote end terminals remote from the common node. The commutation circuit is adapted to maintain each of the stator windings in one of two alternative states including an active state applying a predetermined drive voltage across the stator winding to drive the stator winding, and an inactive state in which the stator winding is not driven. A controller is operatively coupled to the commutation circuit to selectively apply the alternative states individually to different ones of the stator windings to operate the DC motor according to a commutation cycle including a plurality of primary commutation steps arranged in a sequence over a motor electrical rotation of 360 degrees. During each one of the primary commutation steps, a selected one of the stator windings is driven while the remaining two stator windings are in the inactive state. A voltage sensor, electrically coupled to the stator windings, is adapted to generate first, second, and third phase-specific voltage signals corresponding respectively to the first, second, and third stator windings. A timing signal generator, coupled to receive the phase-specific voltage signals, is adapted to select the phase-specific voltage signals of the two stator windings in the inactive state during any given one of the primary commutation steps and to generate a timing signal responsive to each coincidence in the voltage levels of the selected phase-specific voltage signals. The controller includes a commutation circuit control function coupled to receive the timing signals and adapted to use the timing signals to determine motor position and speed.

Preferably, the voltage sensor comprises first, second, and third sensing terminals electrically coupled to the first, second, and third remote end terminals, respectively. Then, each of the phase-specific voltage signals consists essentially of the voltage at the associated remote end terminal.

A salient feature of the present invention resides in using the remote end terminal voltages of the undriven phases in lieu of the BEMF signals of these phases, to monitor motor position and speed. In each phase of the motor, the BEMF and the remote end terminal voltage vary with motor operation, according to the following equation:

$$V_T = V^* + V_I + M(di/dt), \quad (1)$$

where $V_T$ is the remote end terminal voltage, $V^*$ is the voltage at the motor at the star point or common node, $V_I$ is the back electromotive force induced in the phase by rotor movement, and $M(di/dt)$ is the voltage induced in the phase due to the coupling of that phase and the driven phase. The term M is a coefficient that is constant for a given pair of phases at constant temperature. In a properly constructed motor, M can be treated as constant. The quantity $(di/dt)$ represents the change in current in the driven phase over time. This current continually changes, leading to a constantly changing induced voltage in the undriven phase due to its coupling with the driven phase.

In practice, it is difficult to determine the BEMF due to the constantly changing factor $(di/dt)$ reflected in a constantly changing induced voltage from the mutual coupling of phases. As a result, direct measurement of the BEMF in an undriven phase is not available as a practical matter to determine the position and speed of a three phase motor operated according to a unipolar configuration.

In accordance with the present invention, this difficulty is overcome by simultaneous measurement of the remote end terminal voltages of the two undriven phases, and using the difference between these voltages to determine motor angular and temporal positions. Assuming that phase A is being driven, equation (1) above can be written with respect to undriven phases B and C as follows:

$$V_{Tb} = V^* + V_{Ib} + M(di/dt)_a, \text{ and} \quad (2)$$

$$V_{Tc} = V^* + V_{Ic} + M(di/dt)_a. \quad (3)$$

When subtracting equation (3) from equation (2), the motor star point voltage terms cancel one another. Likewise, the terms $M(di/dt)_a$ concerning voltage induced by the mutual coupling between the driven and undriven phase, cancel one another because the voltage induced in phase B when phase A is driven is the same as the voltage induced in phase C when phase A in driven. Therefore, the result of the subtraction can be written as follows:

$$V_{Tb} - V_{Tc} = V_{Ib} - V_{Ic}. \quad (4)$$

In other words, when phase A is driven, the difference between the voltages measured at the remote end terminals of the phases B and C, is the same as the difference between the BEMF voltages of phases B and C.

A coincidence of the BEMF voltages of undriven phases B and C, i.e. an angular or temporal point at which their difference is zero, coincides with the angular or temporal center of the primary commutation cycle segment during which phase A is driven. Likewise, the BEMF voltages of undriven phases A and C coincide at the center of the primary commutation cycle segment during which phase B is driven, and the BEMF voltages of undriven phases A and B coincide at the center of the commutation cycle segment during which phase C is driven.

Because the BEMF voltages are difficult to measure, they are not useful as a practical matter in locating center points of commutation cycle steps. In contrast, voltages at the remote end terminals of undriven phases are easily measured. With reference to equation (4) above, it is apparent that the centers of commutation cycle segments during which phase A is driven can be identified by the coincidence of the measured voltages $V_{Tb}$ and $V_{Tc}$. Center points of commutation cycle segments during which phase B or phase C is driven, are similarly identified by the coincidence of the undriven phases (A and C, or A and B).

Accordingly, accurate and precise position information traditionally obtainable only through sensing BEMF voltages of undriven phases or through the use of auxiliary position sensors, now can be obtained by sensing remote end terminal voltages of the undriven phases.

A further advantage arises from the use of episodes of coincidence or equality of the undriven phase voltages, in that there is no need to measure magnitudes of the voltages of interest. All that is required is to sense points at which they coincide.

The system can be digitally configured, with first, second, and third analog-to-digital converters coupled to receive the first, second, and third phase specific voltage signals respectively to generate first, second, and third digital signals. In these arrangements, the timing signal generator can reside in a microprocessor and comprise first, second, and third digital comparator functions receiving different pairs of the digital signals. Each digital comparator function generates a timing signal in response to determining a coincidence in its associated pair of the digital signals.

In an analog alternative, the timing signal generator can comprise first, second and third comparator amplifiers coupled to receive different pairs of the phase-specific voltage signals.

The system can be operated in a high side switching configuration with switching elements coupled individually between the remote end terminals and the high voltage terminal of a DC power supply. In this configuration, the common node is coupled to the low voltage terminal of the power supply. Alternatively, the system may have a low side switching configuration, in which the common node is coupled to the high voltage terminal of the power supply.

Further in accordance with the invention, the controller can include a projection function adapted to project future or expected points of coincidence in the voltage levels of the selected phase-specific voltage signals. The controller can incorporate an error generating component, adapted to measure the voltage levels of the selected phase-specific voltage signals and generate an error signal in proportion to a difference between the measured voltage levels at each point of expected coincidence. Then, the controller further incorporates a correction component, adapted to alter a timing of the commutation cycle toward synchronization with motor position and speed, based upon the error signal.

Another aspect of the present invention is a device for controlling an electrically commutated motor. The device includes a voltage level sensor with at least three voltage sensing terminals adapted to be coupled to different stator windings to receive voltage information corresponding to their associated stator windings. The stator windings are coupled to a common node and correspond to three different motor phases of an electrically commutated motor. The device further includes a commutation circuit controller adapted to be coupled to a unipolar commutation circuit of an electrically commutated motor. The controller provides control signals to the commutation circuit to operate the commutation circuit according to a commutation cycle having commutation cycle segments arranged in a sequence over a motor electrical rotation of 360 degrees, including a plurality of primary commutation cycle segments during which a given one of the stator windings is driven while the remaining two stator windings are not driven. A timing signal generating function is operatively associated with the voltage level sensor to receive the voltage information, and is operative during a given primary commutation cycle segment to select voltage levels of the two stator windings that are not driven during the given primary commutation cycle segment. The timing signal generating function is adapted to generate a timing signal responsive to each coincidence of the selected voltage level. The commutation circuit controller comprises a commutation circuit control function coupled to receive the timing signals and adapted to use the timing signals to govern provision of the control signals to the commutation circuit.

Another aspect of the present invention is a process for maintaining a commutation cycle synchronized with motor position and speed, in a DC motor configuration having a unipolar commutation circuit. The process includes:

a. sensing voltages at a plurality of stator windings corresponding to three different phases of a DC motor operated according to a commutation cycle including a plurality of primary commutation cycle segments arranged in a sequence over 360 degrees of electrical rotation during which a given one of the stator windings is driven by applying a predetermined drive voltage across the given stator winding to maintain it in an active state while the other two stator windings are undriven;

b. during each of a plurality of the primary commutation cycle segments, sensing first and second voltages corresponding individually to the other stator windings and generating a timing signal responsive to determining a coincidence of the first and second voltages; and c. using the timing signals to indicate current angular or temporal motor positions and project future angular or temporal motor positions, to govern operation of the commutation cycle in a manner tending to synchronize the commutation cycle with motor position and speed.

Yet another aspect of the present invention is a process for synchronizing a commutation cycle with motor position at speed in a unipolar electrically commutated DC motor and driver configuration. The process includes:

a. operating a three phase DC motor with a unipolar driver according to a commutation cycle comprising primary commutation cycle steps during which one of the phases is driven while the other two phases are not driven; and b. while so operating the three phase DC motor:

(i) monitoring voltages of the undriven phases during the primary commutation cycles to the detect coincidence episodes in which voltages of the undriven phases are equal;

(ii) using the coincidence episodes as timing signals to project future timing points at which the voltages of the undriven phases are expected to coincide;

(iii) upon reaching a selected one of the projected future timing points, measuring the voltages of the undriven phases to determine whether a voltage difference between said voltages at the selected timing point has a non-zero value; and (iv) responsive to determining that the voltage difference has a non-zero value, generating an error signal based on the voltage difference and using the error signal to bring the commutation cycle into a more synchronous relation to motor position and speed.

Thus, in accordance with the present invention, position sensing and commutation in a unipolar trapezoidally driven three phase motor features are accomplished without auxiliary position sensors, regardless of whether the back electromotive force signals in the undriven phases are sinusoidal or trapezoidal in form. Remote end terminal voltages of the undriven phases are measured directly, and used in lieu of BEMF signals to locate centers of commutation cycle steps. Timing signals generated each time the measured voltages coincide accurately indicate motor position and speed, and promote reliable projection of future timing points to govern the commutation cycle.

IN THE DRAWINGS

For a further understanding of the foregoing and other advantages, reference is made to the following description and to the drawings, in which.

Figure 8:
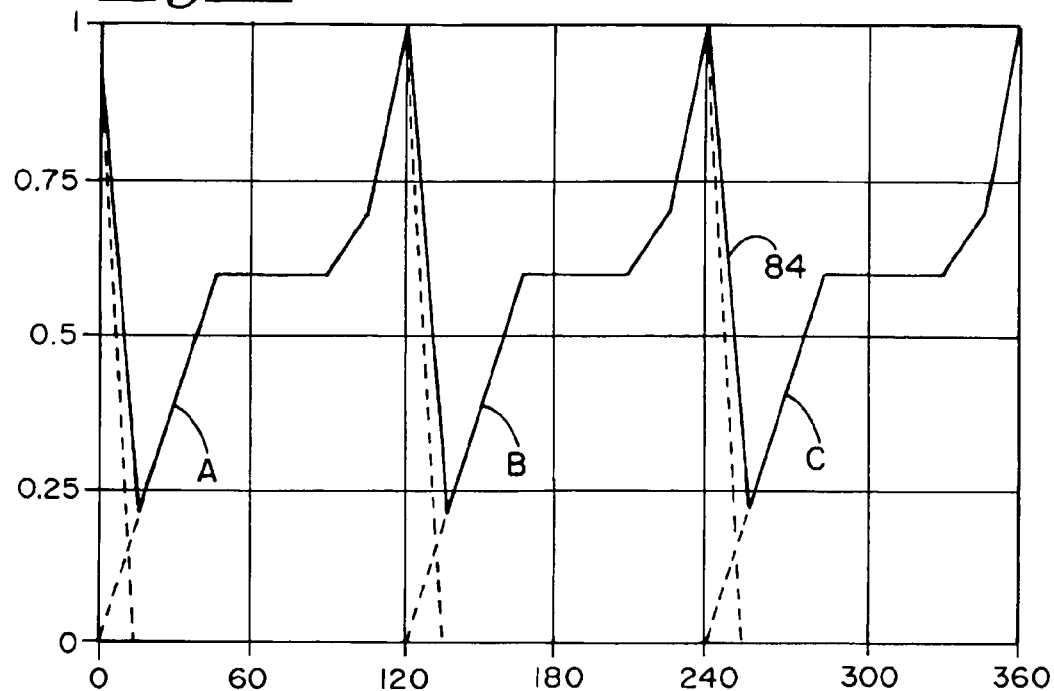
Figure 9:
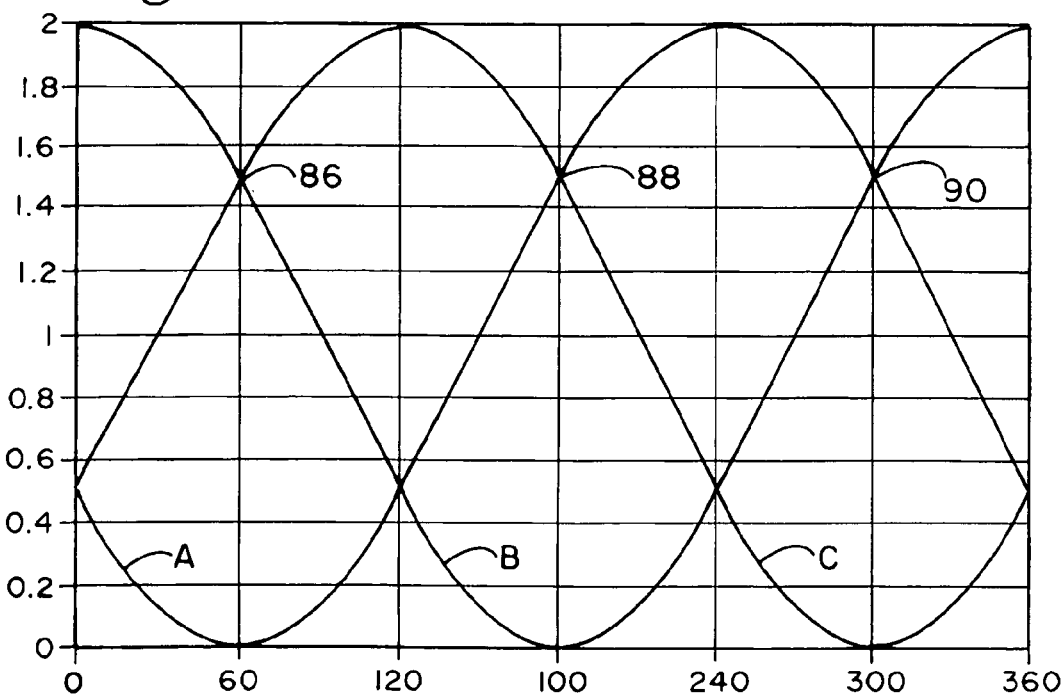
Figure 10:
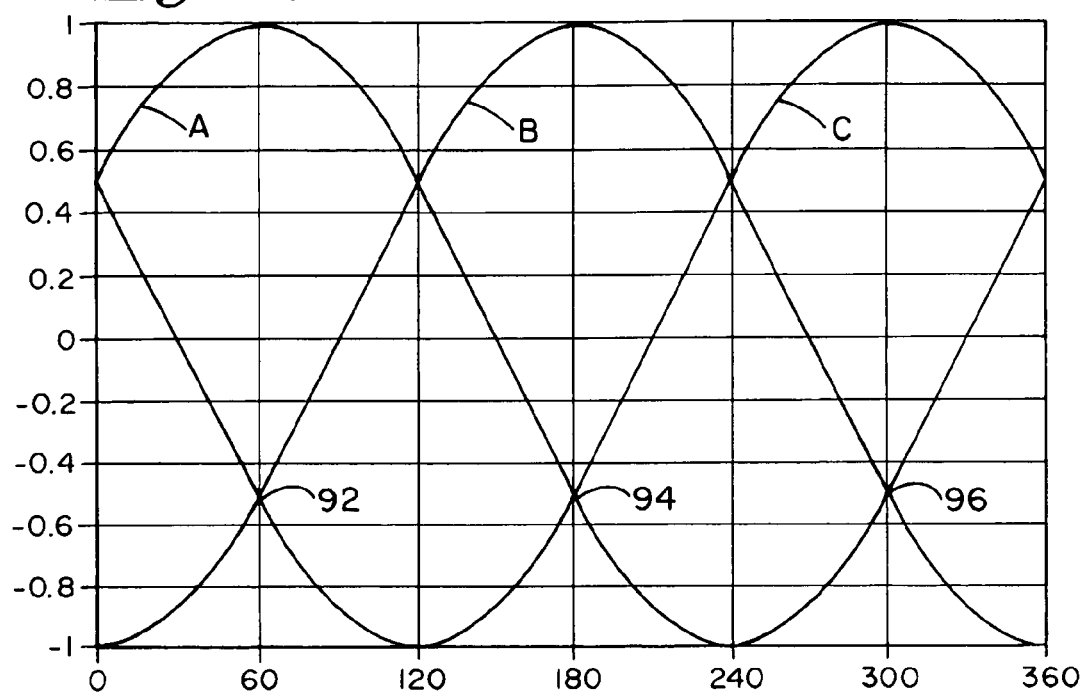
Figure 11:
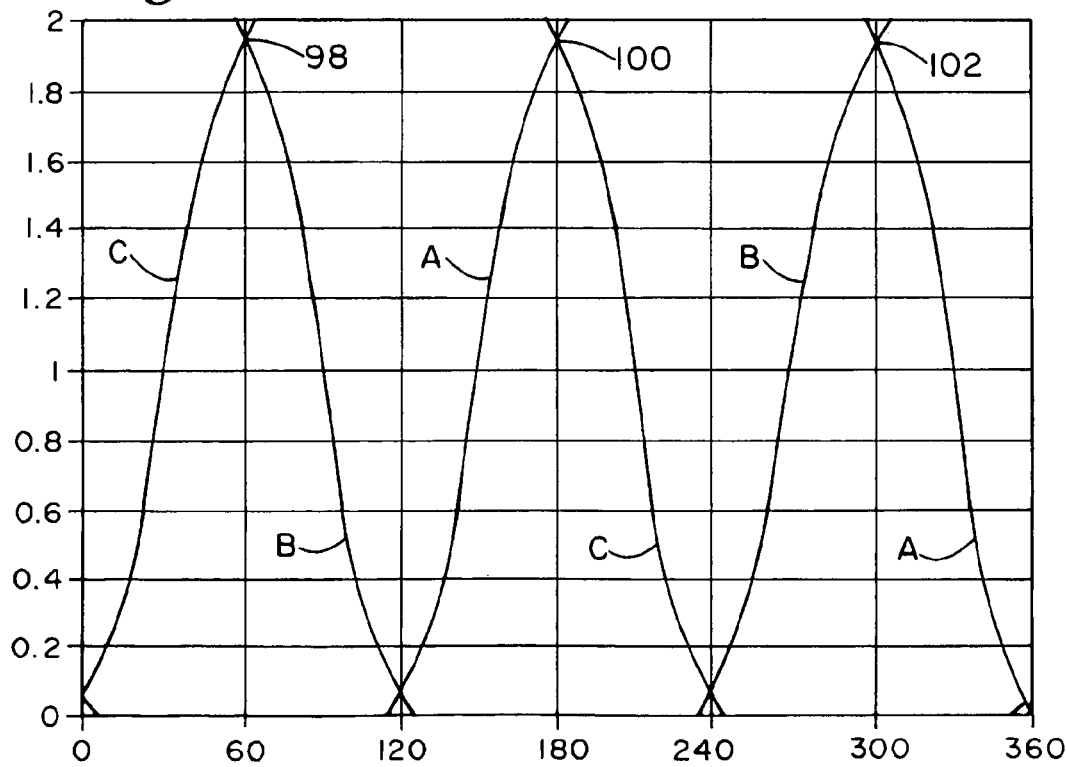
Figure 12:
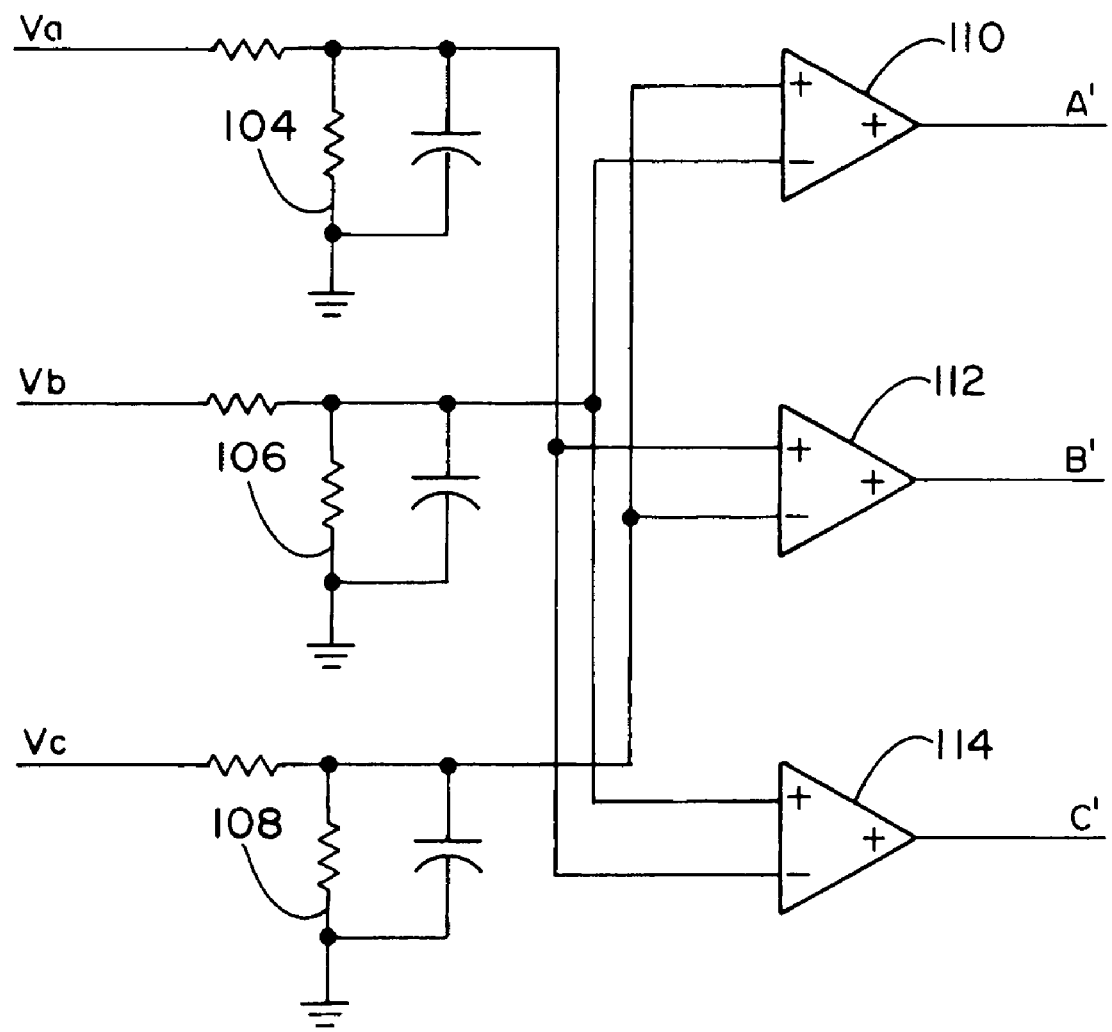
Figure 13:
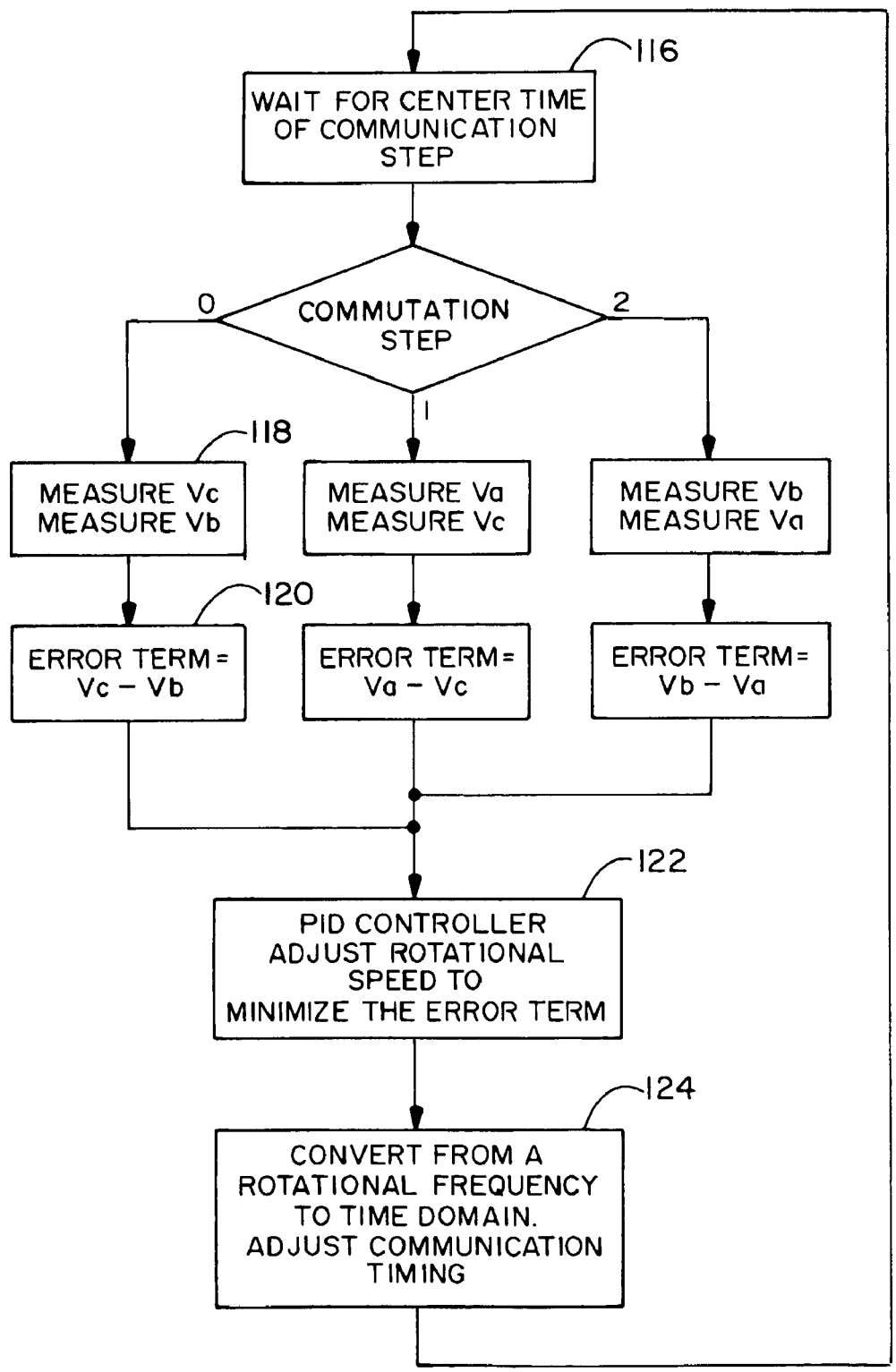
Figure 14:
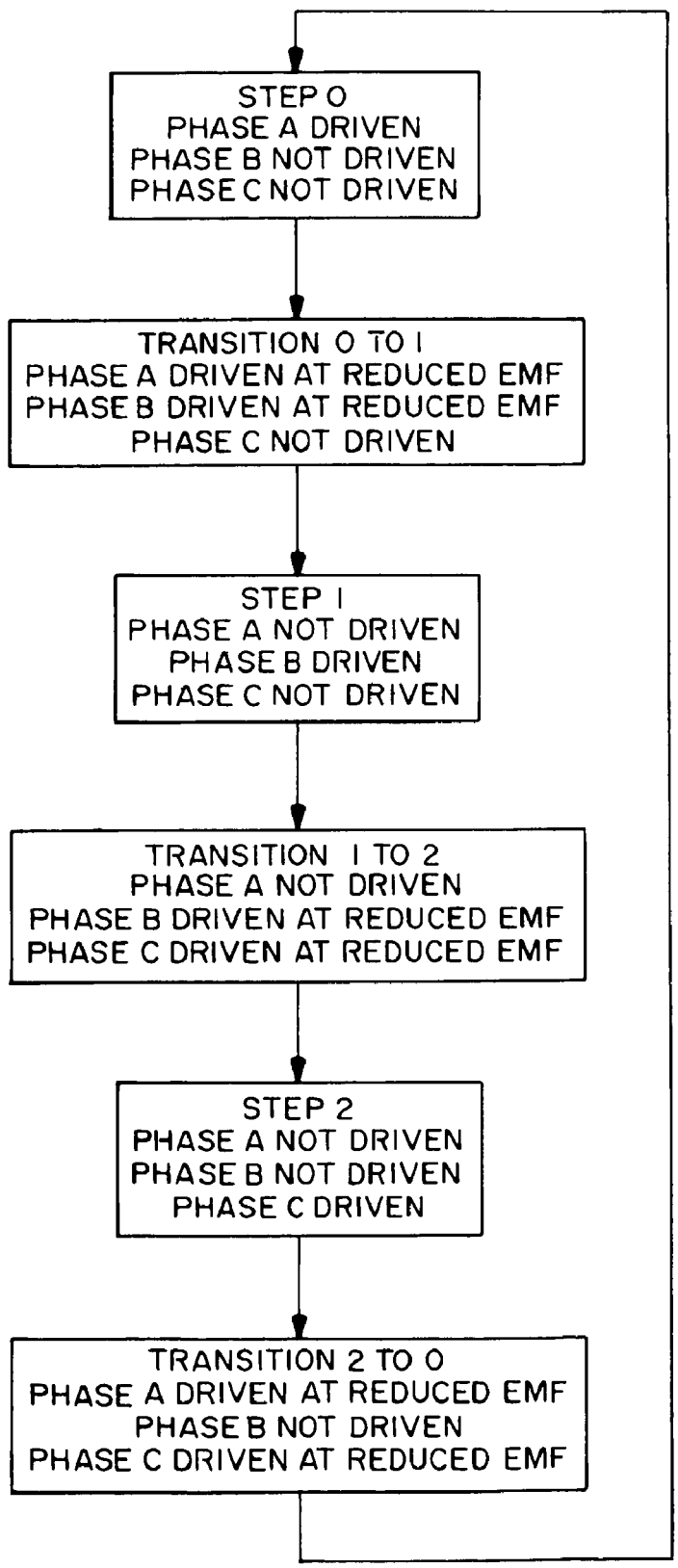
Figure 15A:
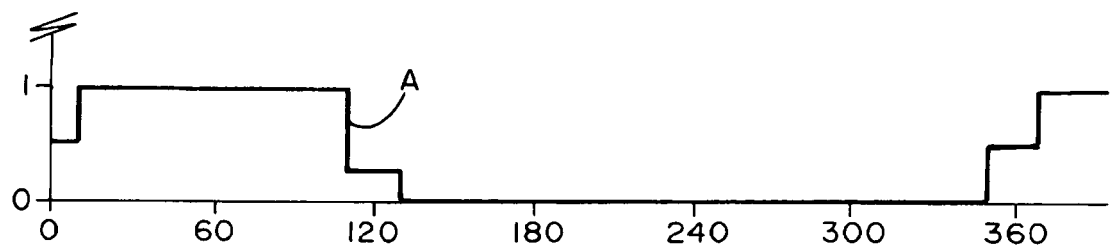
Figure 15B:
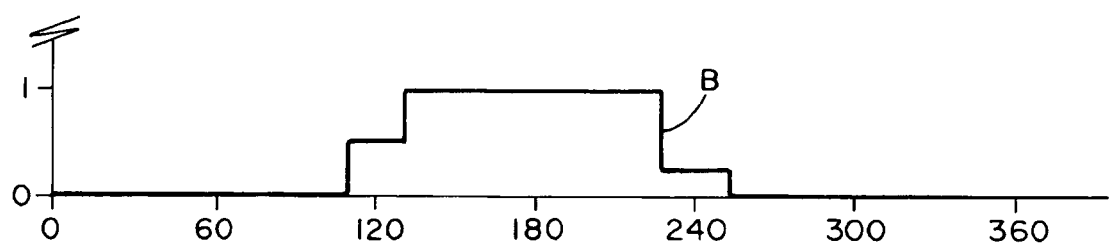
Figure 15C:
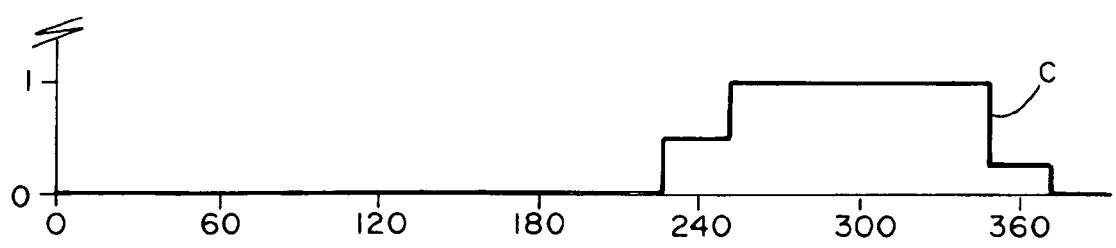
Figure 16:
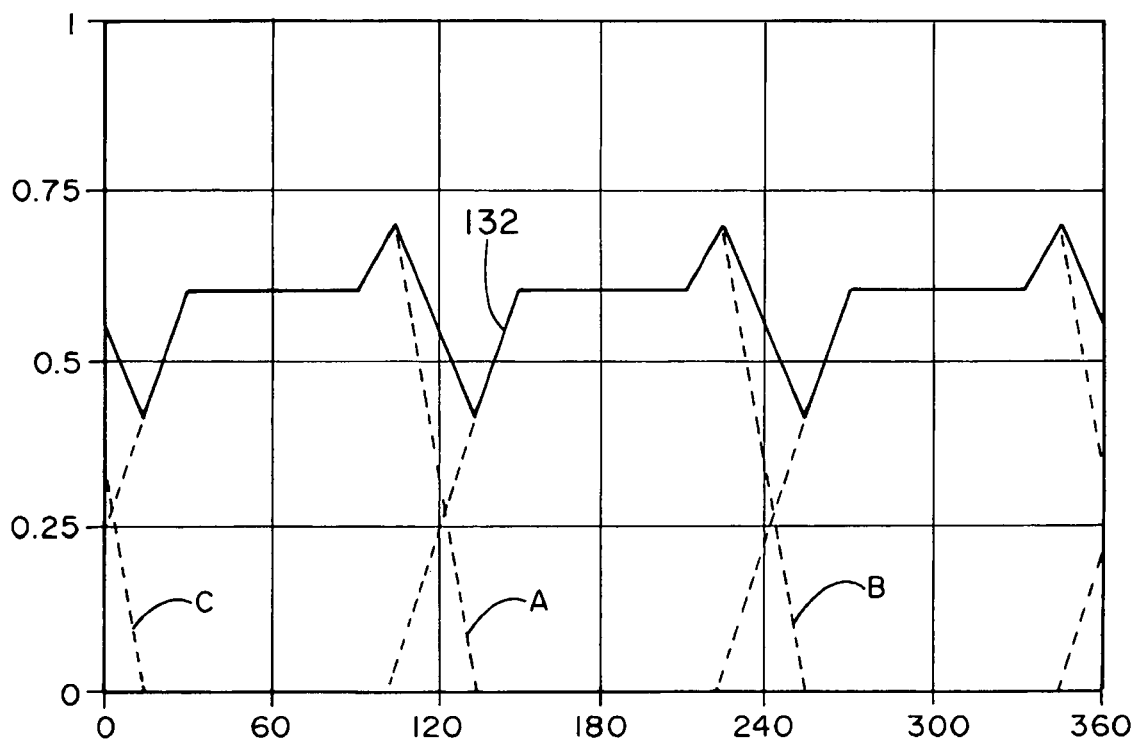

FIGS. 7 A-C graphically depict voltages applied to the three phases of the motor;

FIG. 8 graphically depicts currents in the three phases due to the drive voltages;

FIG. 9 graphically depicts back electromotive force (BEMF) voltages in the three phases;

FIG. 10 graphically depicts BEMF voltages in three phases of an alternative motor driven according to a high side switching configuration;

FIG. 11 graphically depicts BEMF voltages in three phases of an alternative motor exhibiting trapezoidal rather than sinusoidal BEMF waveforms;

FIG. 12 is a schematic illustration of a circuit employing analog comparators for determining points at which measured voltages of the undriven phases coincide;

FIG. 13 is a flow chart illustrating use of a PID loop to alter the commutation cycle toward closer synchronization with motor position and speed;

FIG. 14 is a flow chart depicting an alternative commutation cycle for the motor;

FIGS. 15 A-C graphically depict voltages applied to three different phases of the motor when implementing the commutation cycle shown in FIG. 14; and FIG. 16 graphically depicts currents in the three phases due to the applied voltages shown in FIG. 15.

DETAILED DESCRIPTION OF THE PREFERRED EMBODIMENTS

Figure 1:
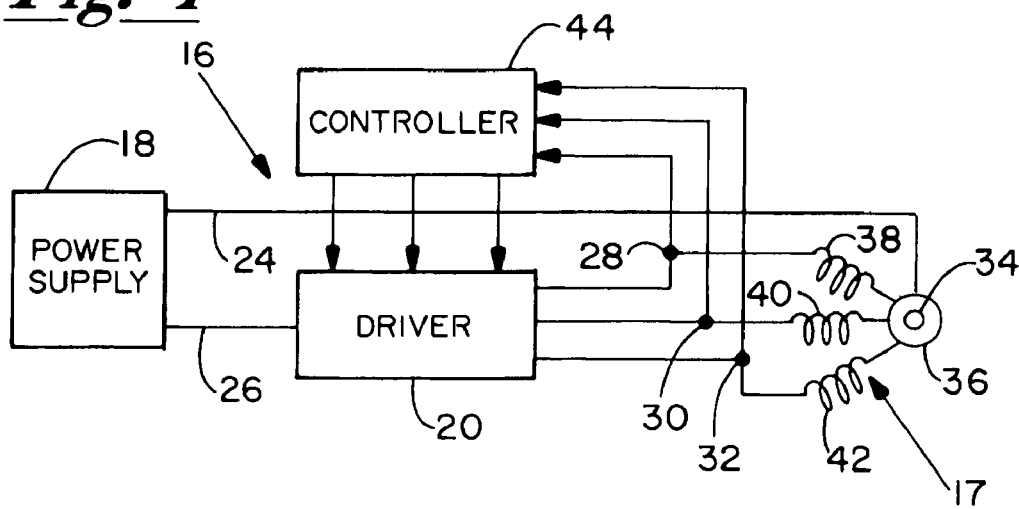
FIG. 1 is a schematic view of a brushless DC motor, unipolar driver, and controller configured in accordance with the present invention.

Turning now to the drawings, there is shown in FIG. 1 a system 16 for coupling a three phase brushless DC motor 17 to a DC power supply 18. System 16 includes a commutation circuit or driver 20 coupled with motor 17 between a high voltage line 24 and low voltage line 26 of the power supply. Driver 20 is coupled to the motor at terminals 28, 30, and 32. The motor includes a rotor 34 surrounded by a stator 36 and supported for rotation relative to the stator through selective driving of stator windings 38, 40, and 42. The stator windings represent angularly separated phases A, B, and C of the motor. Driver 20 and the motor are coupled in a unipolar configuration in which stator windings 38, 40, and 42 have proximal end terminals coupled to a common node or star point of motor 17. Terminals 28, 30, and 32 can be thought of as respective remote end terminals of stator windings 38, 40, and 42. The remote end terminals are relatively remote from the common node, each disposed at an end region of its associated stator winding opposite the end region with the proximal end or "star point" terminal.

System 16 further includes a controller 44, preferably a microprocessor, for controlling driver 20 to selectively, alternatively, and individually drive stator windings 38, 40, and 42. Controller 44 further is coupled to remote end terminals 28, 30, and 32 to receive voltages from the stator windings, in each case during a step in the commutation cycle when the stator winding is not driven, i.e. when the voltage of the DC power supply is not applied across that stator winding. During each such step, controller 44 senses the voltages of the undriven stator windings to determine the rotor angular or temporal position relative to the stator. The rotor position information is used by the controller to synchronize the commutation cycle with the rotor position.

Figure 2:
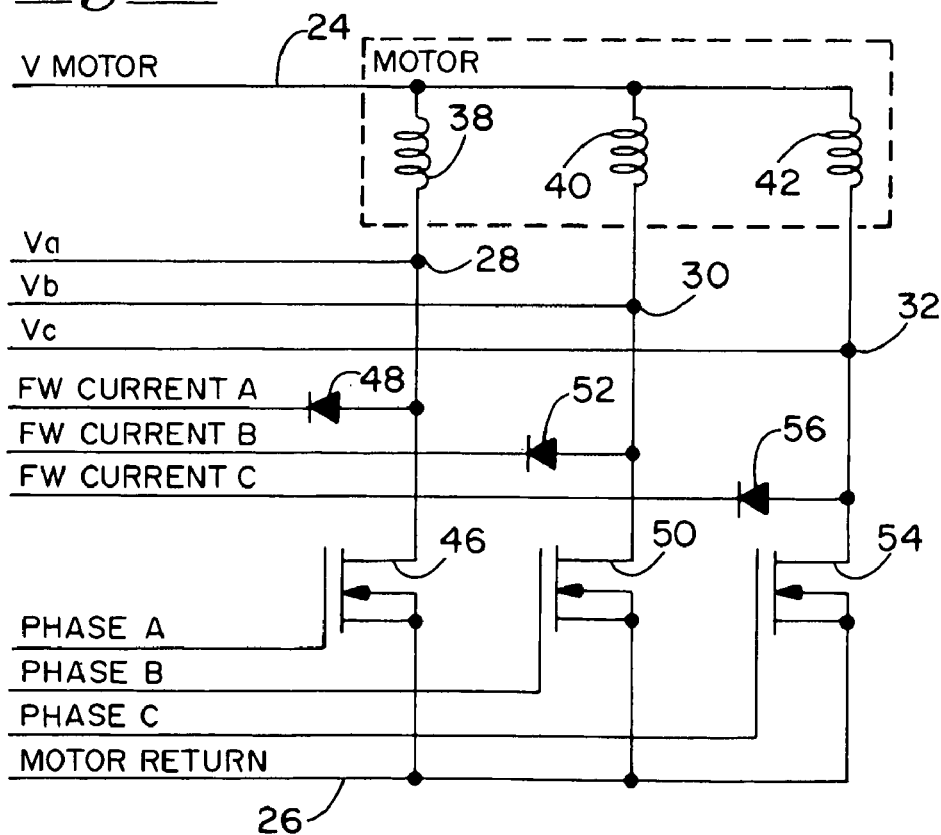
FIG. 2 is a schematic view of the driver.

As shown schematically in FIG. 2, driver 20 includes a series of switching elements in the form of field-effect transistors (FETs) coupled between high voltage line 24 (labeled "V motor") and low voltage line 26 (labeled "Motor Return"). A switching element 46 and a freewheeling diode 48 are coupled with terminal 28 in series between lines 24 and 26 to associate these components with stator winding 38. In similar fashion, a switching element 50 and diode 52 are serially coupled and associated with stator winding 40, and a serially coupled switching element 54 and diode 56 are associated with stator winding 42. The inputs labeled "Phase A", "Phase B" and "Phase C" are control signals provided to the respective gate terminals of switching elements 46, 50, and 54. The lines labeled "FW Current A", "FW Current B", and "FW Current C" extend from diodes 48, 52, and 56, respectively. When a given one of the phases is switched between the active state (being driven) and the inactive state (not driven), the associated freewheeling diode and line provide a decay path for current flowing to through the phase. Several different approaches are known for dealing with the current flowing to the freewheeling diode. These approaches are not further discussed, since all are compatible with the present sensorless drive system.

Figure 3:
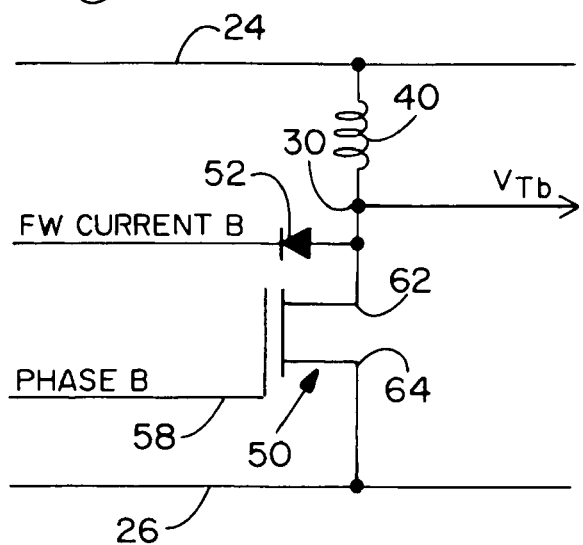
FIG. 3 is an enlarged view showing part of the driver.

As shown in FIG. 3 with respect to motor phase B, control signal "Phase B" is provided to a gate terminal 58 of switching element 50. A source terminal 62 of FET 50 is coupled to terminal 30, while a drain terminal 64 of the FET is coupled to low voltage line 26. Remote end terminal 30 is associated with stator winding 40 as previously noted, and provides a terminal voltage input $V_{Tb}$ to controller 44.

Each FET is controllably switched by the input to its gate terminal. A logic level "1" to gate 58 switches FET 50 "on" to electrically couple stator winding 40 between high and low voltage lines 24 and 26, thus to drive stator winding 40. When input "Phase B" is at the low or "0" level, switching element 50 is "off" to set stator winding 40 in an inactive state in which the stator winding is not driven.

Switching elements 46 and 54 are similarly governed by the inputs to their gate terminals. Each switching element is operable to maintain the associated stator winding or phase in one of two states: an active state for driving the corresponding stator winding at the predetermined drive voltage, and an inactive state in which the corresponding stator winding is not driven.

In the motor and drive configuration shown in FIG. 2, the proximal ends of the stator windings 38, 40, and 42 are coupled in a common node, the motor star point, which in turn is directly coupled to high voltage line 24 of the DC power supply. Remote end terminals 28, 30, and 32 are coupled to low voltage line 24, in each case with the FET or switching element coupled between the remote end terminal and low voltage line 26. This is known as a low side switching configuration.

Figure 4:
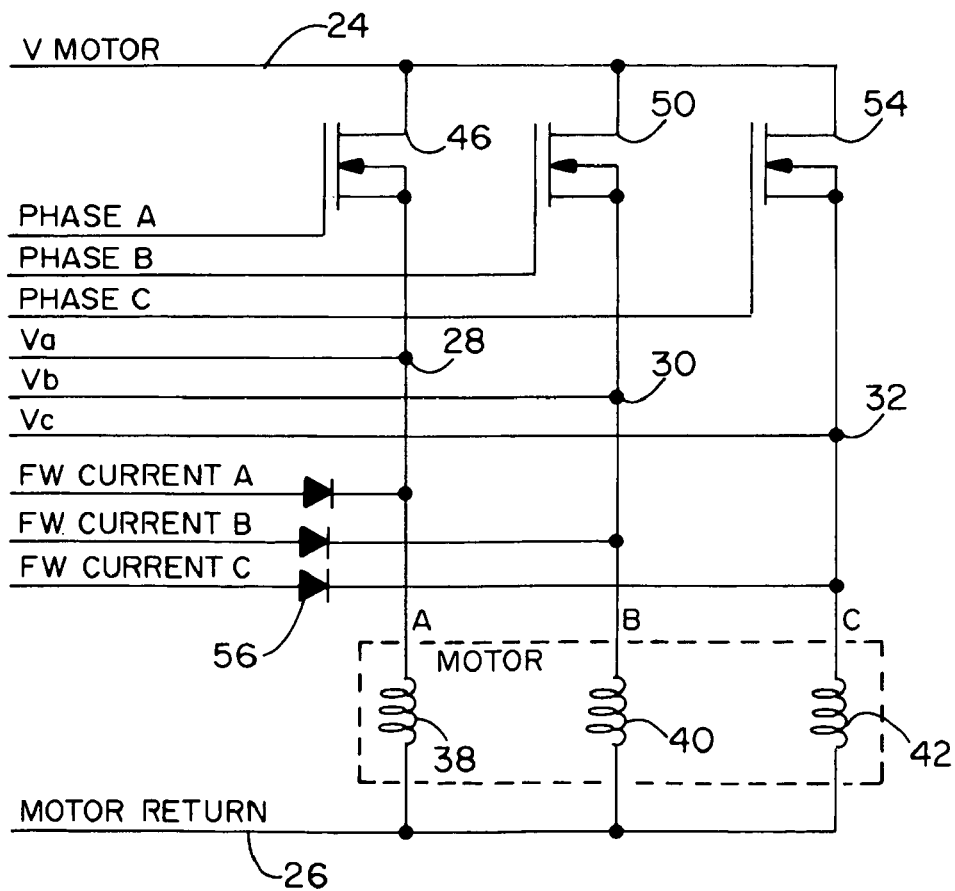
FIG. 4 is a s schematic view of an alternative driver configured for high side switching.

FIG. 4 illustrates an alternative embodiment motor and drive arrangement in which the proximal ends of stator windings 38, 40, and 42 again are coupled at a common node or star point. The common node is electrically coupled to low voltage line 26 instead of the high voltage line. Remote end terminals 28, 30, and 32 are coupled to high voltage line 24, through switching elements 46, 50, and 54, respectively. This is known as a high side switching configuration. As before, each stator winding or phase is driven by providing a logic level "1" to the gate of the associated FET to couple the stator between the high and low voltage lines to drive the stator winding.

Figure 5:
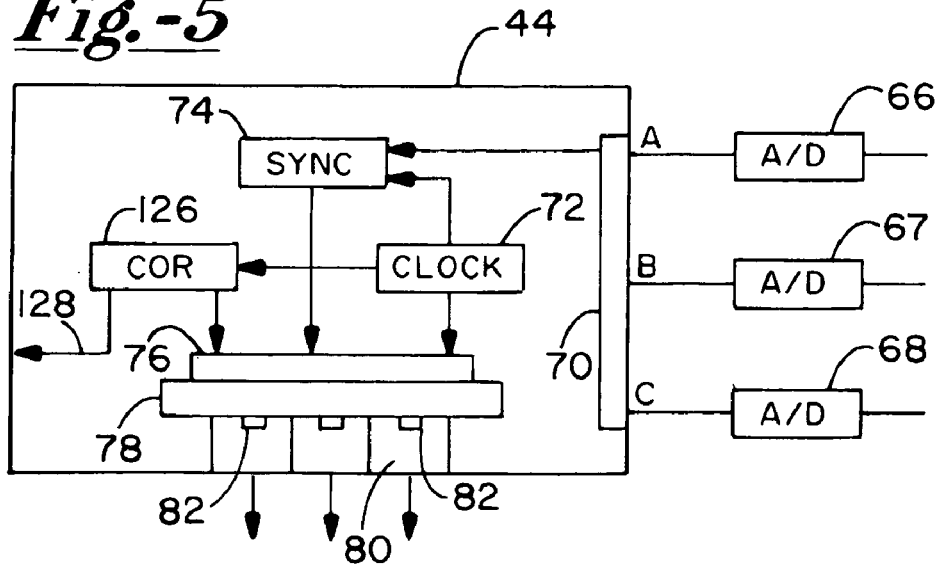
FIG. 5 is a diagrammatic view of the controller.

As seen in FIG. 5, controller 44 is a microprocessor configured to control driver 20 based on current rotor position information received from stator windings 38, 40 and 42. The controller includes a bank of data registers providing a storage area 70 for receiving inputs A, B and C from the stator windings. Each of inputs A-C is filtered or otherwise converted to a digital input. In the approach illustrated, A/D converters 66, 67, and 68 receive voltages $V_{Ta}$, $V_{Tb}$, and $V_{Tc}$, from remote end terminals 28, 30, and 32 and generate the respective digital inputs A, B, and C. During the time a given stator winding is driven, the inputs associated with the two undriven stator windings are sampled simultaneously. Controller 44 includes an internal clock 72. A synchronizing function 74, preferably a computer program, is coupled to clock 72 and storage area 70. A timing function 76 is coupled to receive inputs from internal clock 72 and synchronizing function 74. The timing function is operatively coupled to a commutation algorithm 78 stored in the controller. A storage area 80 includes three data registers, one corresponding to each of the driver control inputs Phase A, Phase B and Phase C. Controller 44 further includes three voltage control functions 82, one associated with each of the driver control inputs.

Storage area 70 receives inputs A-C and samples each of the inputs when the corresponding stator winding is not driven. The synchronizing function is triggered by a coincidence of the sampled terminal voltage signals. Timing function 76 uses the inputs from clock 72 and synchronizing function 74, first to initiate the commutation cycle synchronous with the angular position of rotor 34, and then to repeatedly step the commutation algorithm through the commutation cycle in synchronization with rotor rotation, i.e. with motor speed. To this end, the timing function uses inputs A-C (current rotor angular position information) and the clock input to "look ahead" in the sense of projecting future rotor positions or times at which the commutation algorithm is to be stepped through the commutation cycle.

Figure 6:
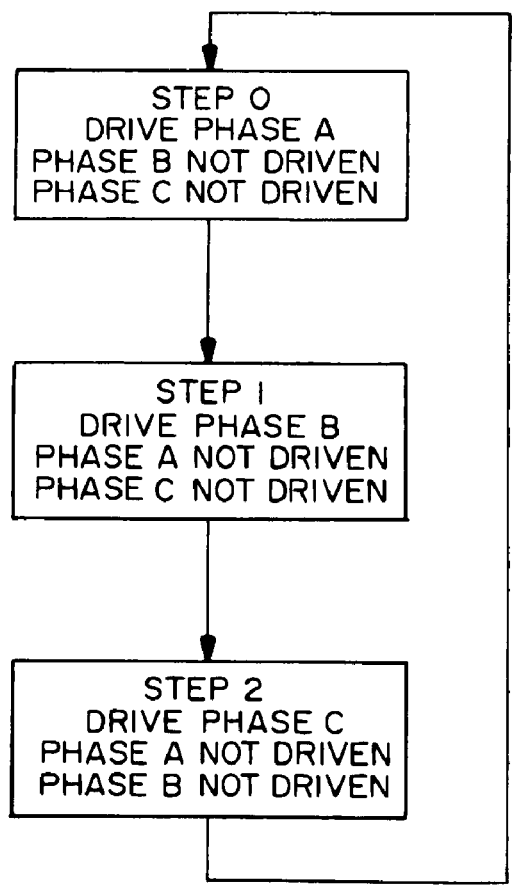
FIG. 6 is a flow chart depicting a commutation cycle for the motor.

FIG. 6 illustrates the three step commutation cycle that governs the DC motor. During each step, one of the phases is driven while the other two phases are not driven.

Figure 7A:
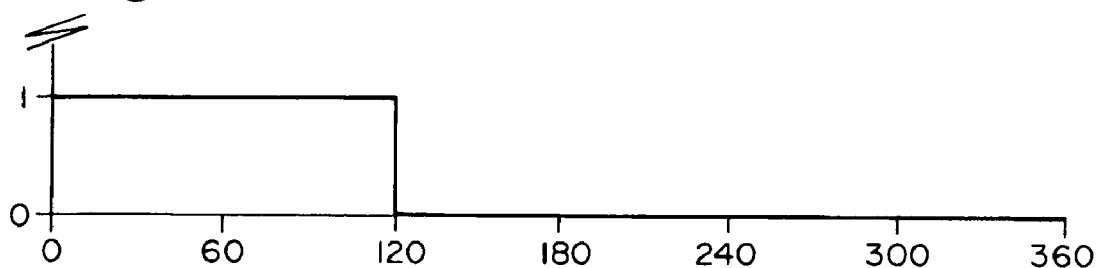
Figure 7B:
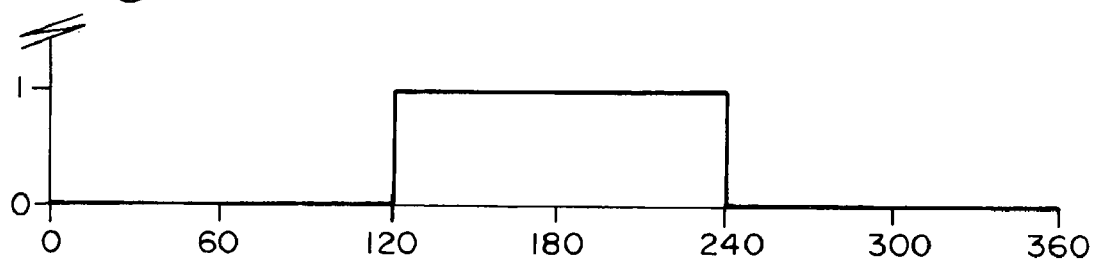
Figure 7C:
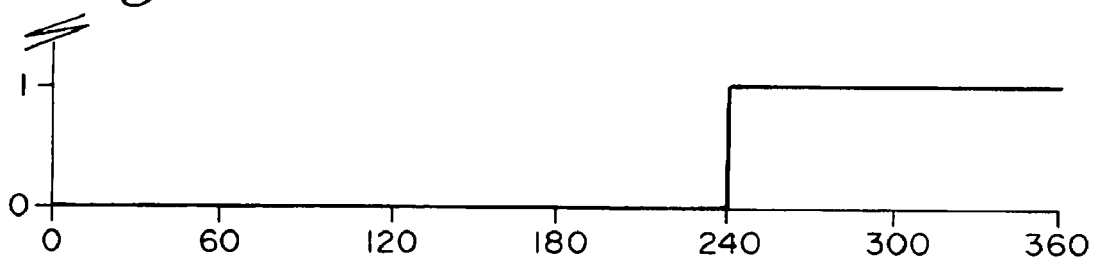

FIGS. 7A-7C graphically illustrate the commutation cycle. The motor phases are aligned to facilitate recognizing the angular spacing. It is to be appreciated that the levels "1" and "0" represent the high voltage and the low voltage of DC power supply 18.

FIG. 8 graphically represents the current levels in phases A, B, and C corresponding to the applied voltages shown in FIGS. 7A-7C. The resultant or sum of the electrical currents in phases A-C also is indicated, at 84. It is apparent that each change in voltage between the active state and the inactive state entails a rapid change in current through the particular phase.

FIG. 9 illustrates the back electromotive force (BEMF) voltages induced in motor phases A-C, i.e. in stator windings 38, 40 and 42, due to rotation of rotor 34. The BEMF waveforms are substantially sinusoidal and repetitive over a cycle of 360 degrees of electrical rotation. This corresponds to the low side switching configuration, the motor and the driver arrangement shown in FIG. 2. The "1" on the vertical scale represents the high voltage of DC power supply 18, which in the low side switching configuration is equivalent to the voltage at the star point (common node) at which the stator windings are coupled. The BEMF waveform corresponding to stator winding 38, labeled "A," has a minimum voltage (0 on the vertical scale) at the 60 degree angular location, which is the center of the commutation cycle step during which phase A is driven. The maximum voltage for phase A (2 on the vertical scale), occurs at 240 degrees. The minimum voltage locations of phases B and C are at 180 degrees and the 300 degrees, respectively, each minimum corresponding to the center of the commutation cycle step during which that phase is driven.

As noted previously, during a commutation cycle step in which a given phase is driven, the other two phases are not driven. For example, over the angular range of 0-120 degrees, when phase A is driven, phases and B and C are inactive. As seen in FIG. 9, the curves representing BEMF waveforms of phases B and C intersect one another at 60 degrees, at the angular center of the commutation cycle step. The intersection, labeled 86 in the figure, represents a coincidence in the voltages of BEMF waveforms B and C at a value of about 1.5 on the vertical scale. In similar fashion, an intersection 88 of the BEMF waveforms of phases A and C occurs at 180 degrees, the center of the commutation cycle step during which phase B is driven. The BEMF waveforms of phases A and B have an intersection 90 at 300 degrees, the center at the step during which phases C is driven.

FIG. 10 is a graphical depiction of BEMF waveforms similar to FIG. 9, corresponding to the high side switching configuration shown in FIG. 4. The BEMF waveforms again are sinusoidal. Each has a maximum voltage ("1" on the vertical scale) at the center of the commutation cycle step during which the phase is driven. In this case, the value "1" corresponds to the high voltage of the DC power supply, and the "0" value represents the star point or common node voltage corresponding to the low voltage of the DC power supply. As indicated at 92, 94, and 96, the BEMF waveforms of the undriven phases intersect one another, i.e. exhibit an equality or coincidence, at the center of the commutation cycle step during which the other phase is driven.

FIG. 11 graphically illustrates BEMF waveforms in a low side switching configuration that differs from the configuration of FIG. 9 in that at the BEMF waveforms are substantially trapezoidal rather than sinusoidal. The trapezoidal shape typically is due to physical factors, such as the number of poles or the magnet and stator winding configuration. In any event, with reference to the waveform for phase A, labeled "A" in the figure, the minimum voltage ("0" on the vertical scale) is present during the commutation cycle step in which phase A is driven, as before. The center of the cycle step again is 60 degrees, but is not precisely defined by the waveform since the waveform is at the minimum voltage level over most of the 0-120 degree range of the commutation cycle step.

In contrast, undriven phases B and C have waveforms that coincide at 60 degrees, forming an intersection 98 that unambiguously locates the center of the commutation cycle step. The intersection occurs at a value of about 1.95 on the vertical scale, higher than the corresponding value for the sinusoidal BEMF waveforms in FIG. 9. However, for locating the center points of commutation cycle segments, the key feature is the coincidence or equality in the BEMF voltages of the undriven phases. The particular value at the intersection is incidental.

As before, the center of the commutation cycle step during which phase B is driven is located by an intersection 100 of the BEMF waveforms for undriven phases A and C. The center of the step during which phase C is driven is located by an intersection 102 of phases A and B.

As seen from FIGS. 9-11, the BEMF signals of the undriven phases coincide at increments of 120 degrees to unambiguously locate angular and temporal centers of the commutation cycle segments of the driven phases. Theoretically, this feature would be particularly useful when the BEMF signals are trapezoidal, with flat horizontal peaks unsuitable for finding locations based on a zero slope in the BEMF curve. However, due to the constantly changing character of the BEMF signals of the undriven phases, they cannot be directly measured and used to locate of commutation cycle segments.

This difficulty is overcome by using voltages measured at remote end terminals 28, 30 and 32, in lieu of the BEMF voltages, to determine the centers of commutation cycle steps. As seen from equation (4) above, intersections of remote end terminal voltages of the undriven phases are equivalent to the intersections of corresponding BEMF voltages in terms of precisely locating center points of the commutation cycle steps. Further, unlike the BEMF signals, the remote end terminal voltages can be directly measured.

With reference to FIGS. 1 and 5, episodes of coincidence or equality in the voltages $V_T$ can be determined digitally according to a process that first converts the remote end terminal voltages to digital signals A, B, and C. In this arrangement, synchronizing function 74 includes three digital comparator functions, preferably computer programs. Each of the comparator functions receives a different pair of the digital signals A, B, and C and is governed to function during commutation steps when its inputs represent the undriven phases. For example, when phase A is driven, the comparator function receiving digital signals B and C is active. The comparator function, in response to detecting an equality or coincidence of digital signals B and C, provides a signal to timing function 76 to indicate the angular or temporal center of the commutation cycle step during which phase A is driven.

FIG. 12 illustrates an alternative analog circuit for locating the centers of commutation cycle steps. The measured remote end terminal voltages are provided respectively to RC filters 104, 106, and 108. The filtered voltage signals are provided to a set of comparator amplifiers 110, 112, and 114. More particularly, the signals from remote end terminals 30 and 32 are input to amplifier 110, the signals from remote end terminals 28 and 32 are input to amplifier 112, and the signals from remote end terminals 28 and 30 are input to amplifier 114.

In comparator amplifier 110, the signal from terminal 32 (phase C) is provided to the positive input, while the signal from terminal 30 (phase B) is provided to the negative input. In this manner, the amplifier is triggered to generate a coincidence signal "A" by a transition from a low state (phase B voltage greater than phase C voltage) to a high state (phase C voltage greater than phase B voltage) to detect the coincidence of these voltages. Amplifiers 112 and 114 similarly are configured to detect coincidence episodes as transitions from the low state to the high state.

In this system, coincidence signals A', B', and C' can be provided directly to timing function 76 as timing signals representing the centers of commutation cycle steps.

Regardless of whether the more digital or more analog process is employed, timing points are generated solely based on detecting when voltages of the undriven phase coincide. There is no need to measure the magnitudes of these voltages, and no need to measure the magnitude of the difference between the voltages. However, according to another aspect of the present invention, the difference between voltages in the undriven phases can be measured at predetermined times and used to synchronize the commutation cycle with motor position and speed. As indicated previously, timing function 76 can be used to project future rotor positions at which the commutation algorithm is to be stepped through the commutation cycle. Similarly, the timing function can project future centers of the commutation cycle steps, i.e. future timing points where the voltages of undriven phases are expected to coincide. In other words, the difference between the voltages is expected to be zero at these projected points.

When measured remote end terminal voltages produce a non-zero difference at any of the projected points, the difference is provided to a PID (proportional-integral-derivative) loop as an error signal to alter the commutation cycle timing toward a closer correspondence with motor position and speed.

FIG. 13 is a flow chart showing a logical sequence for implementing this feature. The initial step, indicated at 116, involves waiting for the arrival of the next projected voltage coincidence in one of the pairs of undriven phases. When the projected time arrives, the corresponding voltages of the undriven phases are measured at 118, and the difference is used to generate an error term, as indicated at 120.

The error term is provided to a PID controller. As indicated at 122, the controller is used to adjust the motor speed to reduce the error. Finally, as indicated at 124, the error signal is converted from an angular or rotational frequency domain to a time domain, and used to correctively alter the timing of the commutation cycle.

The synchronizing process can be implemented through hardware and software in controller 44. For example, the comparator functions of synchronizing function 74 can be configured to generate, at the projected future timing points, information concerning non-zero voltage differences, if any, indicated by the associated pair of digital inputs A, B, and C. Upon determining a non-zero voltage difference, synchronizing function 74 generates an error signal. The error signal can be proportional to the magnitude of the voltage difference, and is directional to indicate which of the digital inputs has indicated the higher voltage.

The error signal is provided to a correction function 126, preferably a computer program. The correction function is configured to generate two outputs in response to receiving the error signal. The first is a general output indicated at 128, provided to a motor control such as pulse width modulation function to accelerate or decelerate the motor.

The other output is a timing control output provided to timing function 76 to selectively alter the timing of the commutation cycle.

Another aspect of the present invention resides in configuring the commutation algorithm 78 to reduce torque ripple for smoother operation of the motor. This result is achieved by augmenting the commutation cycle with a series of transitional steps, one between each pair of adjacent primary steps. As seen in FIG. 14, the augmented commutation cycle consists of six steps: three primary steps and three transitional steps in an alternating sequence.

FIGS. 15 A-C show the commutation cycle with respect to stator windings steps 38, 40 and 42 representing phases A, B, and C angularly offset from another by 120 degrees with respect to 360 degrees of electrical rotation. It is preferred that transitional steps have angular dimensions much less than the angular dimensions of primary steps. This is to insure adequate times during which only one phase is driven, to detect the points where voltages of the undriven phases coincide.

To provide the desired stator angular or temporal spacing, the commutation algorithm is stepped in alternating angular increments of 110 degrees for primary steps and 10 degrees for transitional steps. The transition points or step initiation points can be temporal locations, or can be directly tied to instantaneous and projected positions of rotor 34. In angular terms, primary step "0" starts at 5 degrees. Transitional step 0 to 1 starts at 115 degrees and ends at 125 degrees, the beginning of primary step 1. The alternating arrangement continues through the final transition step (5 to 0) which begins at 355 degrees and ends at 5 degrees. Thus, with reference to the conventional cycle shown in FIGS. 6 and 7, each transitional step is centered on the angular or temporal location of the abrupt change from one primary step to the next primary step in a conventional cycle.

As seen in FIGS. 15 A-C, two of the motor phases are driven during each transitional step. The phase driven during the preceding primary step is driven at a first alternate voltage $V_1$ less than the predetermined drive voltage. The phase scheduled to be driven during the next primary commutation cycle step is driven at a second alternate voltage $V_2$ lower than the predetermined drive voltage but higher than the first alternate voltage $V_1$.

With reference to FIG. 5, the modified commutation cycle is implemented using voltage control functions 82. The voltage control functions are individually associated with the driver control inputs. Thus, a different one of voltage control functions is associated with each of FET switching elements 46, 50, and 54.

Voltage control functions 82 preferably are pulse width modulation functions. Thus, in the same manner as the high voltage from power supply 18 can be pulse width modulated to control motor speed, each of voltage control functions 82 is operable with respect to its associated FET to selectively reduce the voltage applied across its associated one stator windings 28, 30, and 32.

Further, as compared to the conventional commutation cycle in which each phase is driven only during a 120 degree angular span, in the modified commutation cycle each phase is driven for an extended angular span that includes not only the given primary commutation cycle step, but also the transitional steps that precede and follow the given primary step. For example, phase B, driven from 120 degrees to 240 degrees in the conventional commutation cycle, is driven from 115 degrees to 245 degrees in the modified cycle.

The smoothing impact of the transitional steps can be understood with reference to FIG. 16, which graphically illustrates the electrical current in the phases A, B, and C resulting from the applied voltages shown in FIG. 15. The resultant or summed currents are indicated at 132. As seen by comparing FIG. 16 with FIG. 8, modifying the commutation cycle to add transitional steps provides a resultant current that is more uniform over the commutation cycle, due to a considerable reduction in the magnitude of peaks and valleys in the curve.

In connection with unipolar motor and driver configurations where phase pulsing or phase demagnetization influence BEMF signals and remote end terminal voltages, an alternative embodiment system can be configured to selectively sample voltages at locations other than expected commutation cycle centers, then locate the centers through extrapolation as disclosed in U.S. patent application Ser. No. 11/941,725 (Brown), assigned to the assignee of this application.

Thus, in accordance with the present invention, reliable and accurate current and future timing points are generated when directly measured end terminal voltages of undriven phases coincide. The timing signals are used to determine motor position and speed, and sequence the commutation cycle governing the motor. This allows sensorless position and speed detection without sensing or measuring BEMF signals, and allows sensorless commutation of trapezoidally driven unipolar three phase motors, regardless of whether they exhibit trapezoidal or sinusoidal BEMF signals.

What is claimed is:

1. A system for controlling a brushless DC motor, including:
   a unipolar motor commutation circuit adapted to be coupled between a DC power supply and a brushless DC motor that includes first, second, and third stator windings corresponding to first, second and third motor phases, the stator windings having respective first, second, and third proximal end terminals coupled to a common node and having respective first, second, and third remote end terminals remote from the common node, the commutation circuit further being adapted to maintain each of the stator windings in one of two alternative states including an active state applying a predetermined drive voltage across the stator winding to drive the stator winding, and an inactive state in which the stator winding is not driven;
   a controller operatively coupled to the commutation circuit to selectively apply the alternative states individually to different ones of the stator windings to operate the DC motor according to a commutation cycle including a plurality of primary commutation cycle steps arranged in a sequence over a motor electrical rotation of 360 degrees, wherein during each one of the primary commutation steps, a selected one of the stator windings is driven while the remaining two stator windings are in the inactive state;
   a voltage sensor electrically coupled to the stator windings and adapted to generate first, second, and third phase-specific voltage signals corresponding respectively to the first, second, and third stator windings; and
   a timing signal generator coupled to receive the phase-specific voltage signals, adapted to select the phase-specific voltage signals of the two stator windings in the inactive state during a given one of the primary commutation steps and to generate a timing signal responsive to each coincidence in the voltage levels of the selected phase-specific voltage signals;
   wherein the controller includes a commutation circuit control function coupled to receive the timing signals and adapted to use the timing signals to determine motor position and speed.

2. The system of claim 1 wherein:
the voltage sensor comprises first, second, and third sensing terminals electrically coupled to the first, second, and third remote end terminals respectively, whereby each of the phase-specific voltage signals consists essentially of the voltage at the associated one of the remote end terminals.

3. The system of claim 1 wherein:
the timing signal generator comprises first, second, and third analog comparator components, each of the comparator components being coupled to receive a different pair of the phase-specific voltage signals as voltage inputs and adapted to generate one of the timing signals responsive to a coincidence in the voltage levels of the associated voltage inputs.

4. The system of claim 1 further including:
first, second, and third analog-to-digital converters coupled to receive the first, second, and third phase-specific voltage signals, respectively, and adapted to generate first, second, and third digital signals correspondingly to the first, second, and third phase-specific voltage signals, respectively; and
wherein the timing signal generator comprises first, second, and third digital comparator functions coupled to receive different pairs of the digital signals, each comparator function being adapted to generate a timing signal responsive to each determination a coincidence in the associated pair of digital signals.

5. The system of claim 1 wherein:
the commutation circuit includes first, second, and third switching elements associated with the first, second, and third remote end terminals respectively, each of the switching elements is coupled between its associated remote end terminal and a high voltage terminal of a DC power supply, and said common node is electrically coupled to a low voltage terminal of the DC power supply.

6. The system of claim 1 wherein:
the commutation circuit includes first, second, and third switching elements associated with the first, second, and third remote end terminals respectively, each of the switching elements is coupled between its associated remote end terminal and a low voltage terminal of a DC power supply, and said common node is electrically coupled to a high voltage terminal of the DC power supply.

7. The system of claim 1 wherein:
the controller comprises a plurality of voltage control functions individually associated with different ones of the stator windings, each voltage control function being operable to apply an alternate voltage less than the predetermined drive voltage across its associated stator winding; and the controller is adapted to selectively actuate the voltage control functions during transitional steps between pairs of adjacent primary commutation steps, and is specifically operable with respect to a selected one of the stator windings undergoing a change in state between a given primary commutation step and a succeeding primary commutation step to actuate the associated voltage control function to apply the alternate voltage across the selected stator winding during a transitional step between the given and succeeding primary commutation steps.

8. The system of claim 1 wherein:
the controller further includes a projection function adapted to project timing points of expected future coincidences in the voltage levels of the selected phase-specific voltage signals, an error generating component adapted to measure the voltage levels of the selected phase-specific voltage signals and to generate an error signal in proportion to a difference between the measured voltage levels, and a correction component adapted to use the error signal to alter a timing of the commutation cycle toward synchronization with motor speed and position.

9. A device for controlling an electrically commutated motor, including:
a voltage level sensor including at least three voltage sensing terminals adapted to be coupled to different stator windings to receive voltage information corresponding to their associated stator windings wherein the stator windings are coupled to a common node and correspond to three different motor phases of an electrically commutated motor;
a commutation circuit controller adapted to be coupled to a unipolar commutation circuit of an electrically commutated motor to provide control signals to the commutation circuit to operate the commutation circuit according to a commutation cycle having commutation cycle segments arranged in a sequence over a motor electrical rotation of 360 degrees including a plurality of primary commutation cycle segments during which a given one of the stator windings is driven while the remaining two stator windings are not driven; and;
a timing signal generating function operatively associated with the voltage level sensor to receive the voltage information, operative during a given primary commutation cycle segment to select voltage levels of the two stator windings that are not driven during the given primary commutation cycle segment, and further adapted to generate a timing signal responsive to each coincidence of the selected voltage levels;
wherein the commutation circuit controller comprises a commutation circuit control function coupled to receive the timing signals and adapted to use the timing signals to govern provision of the control signals to the commutation circuit.

10. The device of claim 9 further including:
a unipolar commutation circuit coupled to receive the control signals from the commutation circuit controller, and further coupled between a DC power supply and the stator windings of an electrically commutated motor.

11. The device of claim 10 wherein:
the common node is electrically coupled to a low voltage terminal of the DC power supply, and the commutation circuit further includes first, second, and third switching elements individually associated with the first, second, and third stator windings, each switching element being coupled between its associated stator winding and a high voltage terminal of the DC power supply.

12. The device of claim 10 wherein:
the common node is electrically coupled to a high voltage terminal of the DC power supply, and the commutation circuit further includes first, second, and third switching elements individually associated with the first, second, and third stator windings, each switching element being coupled between its associated stator winding and a low voltage terminal of the DC power supply.

13. The device of claim 9 wherein:
the voltage level sensor includes first, second, and third sensing terminals individually electrically coupled to first, second, and third terminals disposed respectively at first, second, and third ends of the stator windings remote from the common node, whereby the voltage information consists essentially of first, second, and third voltage at the first, second, and third terminals respectively.

14. The device of claim 13 wherein:
the timing signal generating function comprises first, second, and third analog comparator components coupled to receive different pairs of the first, second, and third voltage signals, wherein each of the comparator components is configured to generate a timing signal responsive to a coincidence in voltage levels of the associated pair of voltage signals.

15. The device of claim 13 wherein:
the timing signal generating function comprises first, second, and third analog-to-digital converters coupled individually to receive the first, second, and third voltage signals and adapted to convert the voltage signals to digital signals; and
first, second, and third digital comparator functions configured to receive and compare different pairs of the digital signals, each of said comparator functions being adapted to generate a timing signal responsive to determining a coincidence of the digital signals of its associated pair.

16. The device of claim 9 further including:
a plurality of voltage control functions individually associated with the different ones of the stator windings, each voltage control function being adapted to apply a predetermined drive voltage less than the predetermined drive voltage across its associated one of the stator windings during a given one of the primary commutation cycle segments, and further adapted to alternatively apply an alternate voltage across the associated stator winding during a transitional commutation cycle segment between the given primary commutation cycle segment and a next subsequent primary commutation cycle segment.

17. The device of claim 9 wherein:
the commutation controller further comprises a projection function adapted to project future timing points at which the first and second voltages are expected to coincide, an error generating component adapted to measure the first and second voltages at least one of the timing points and generate an error signal in proportion to a difference between the measured first and second voltages, and a correction component adapted to use the error signal to alter timing of the commutation cycle toward synchronization with motor speed and position.

18. In a brushless DC motor configuration having a unipolar driver, a process for maintaining a commutation cycle synchronized with motor position and speed, including:
sensing voltages at a plurality of stator windings corresponding to three different phases of a DC motor operated according to a commutation cycle including a plurality of primary commutation cycle segments arranged in a sequence over 360 degrees of electrical rotation during which a given one of the phases is driven by applying a predetermined drive voltage across each stator winding corresponding to the given phase while the other two phases are undriven;

during each of a plurality of the primary commutation cycle segments, comparing first and second voltages corresponding individually to the undriven phases and generating a timing signal responsive to detecting a coincidence of the first and second voltages; and using the timing signals to indicate current angular or temporal motor positions and project future angular or temporal motor positions, to govern operation of the commutation cycle in a manner tending to synchronize the commutation cycle with motor position and speed.

19. The process of claim 18 wherein:

comparing first and second voltages comprises providing different pairs of voltages corresponding individually to the three different phases to first, second, and third analog comparator components to generate respective first, second, and third timing signals, each indicating a coincidence in voltages corresponding to the associated pair of undriven phases.

20. The process of claim 18 wherein:

comparing first and second voltages comprises converting voltages corresponding individually to the three different phases to respective first, second, and third digital values, comparing different pairs of the digital values when their corresponding phases are undriven, and generating timing signals responsive to coincidence events during which the compared digital values coincide.

21. The process of claim 18 wherein:

the stator windings have proximal ends coupled to a common node and further have opposite ends remote from the common node comprising respective first, second, and third remote end terminals; and sensing the voltages at a plurality of stator windings comprises detecting the voltages directly at the remote end terminals.

22. The process of claim 18 further including:

generating a plurality of transitional commutation cycle segments between adjacent primary commutation cycle segments, wherein generating each transitional commutation cycle segment comprises applying an alternate voltage across each stator winding corresponding to said given one of the phases, wherein the alternate voltage is less than the predetermined drive voltage.

23. The process of claim 18 further including:

using the timing signals to project future timing points at which the first and second voltages are expected to coincide, comparing the first and second voltages upon reaching a selected one of the projected future timing points, generating an error signal in proportion to a difference between the first and second voltages at the selected timing point, and using the error signal to bring the commutation cycle toward closer synchronization with motor position and speed.

24. In a unipolar electrically commutated DC motor and driver configuration, a process for synchronizing a commutation cycle with motor position and speed, including:

operating a three phase brushless DC motor with a unipolar driver according to a commutation cycle comprising primary commutation cycle steps during which one of the phases is driven while the other two phases are not driven; and while so operating the motor:
(i) monitoring voltages of the undriven phases during the primary commutation cycle steps to detect coincidence episodes in which voltages of the undriven phases coincide;
(ii) using the coincidence episodes as timing signals to project future timing points at which the voltages of the undriven phases are expected to coincide;
(iii) upon reaching a selected one of the projected future timing points, measuring the voltages of the undriven phases to determine whether a voltage difference between said voltages at the selected timing point has a non-zero value; and
(iv) responsive to determining that the voltage difference has a non-zero value, generating an error signal based on the voltage difference and using the error signal to bring the commutation cycle into a more synchronous relation to motor position and speed.

25. The process of claim 24 wherein:

using the error signal comprises providing the error signal to a controller operatively coupled to the motor, and using the controller to selectively alter a rotational speed of the motor toward synchronization with the commutation cycle as determined by the future timing points.

26. The process of claim 24 wherein:

using the error signal comprises providing the error signal to a controller operatively coupled to the motor to selectively alter a timing of the commutation cycle toward synchronization with motor position and speed.

27. The process of claim 24 wherein:

generating the error signal comprises generating the error signal at a magnitude in proportion to the non-zero value of the voltage difference.

* * * * *